United States Patent Office 2,995,543
Patented Aug. 8, 1961

2,995,543
1-METHYL-1-CYCLOBUTENES HAVING AN EXO-CYCLIC HYDROCARBON RADICAL DOUBLY BONDED TO CARBON IN THE 3-POSITION, THEIR PREPARATION AND POLYMERS THEREOF

John K. Williams, Wilmington, Del., assignor to E. I. du Pont de Nemours and Company, Wilmington, Del., a corporation of Delaware
No Drawing. Filed Nov. 19, 1956, Ser. No. 622,828
22 Claims. (Cl. 260—82.1)

This invention relates to new monomeric and polymeric hydrocarbons. More particularly, this invention relates to a new type of unsaturated cyclic hydrocarbons and their polymers, and to a novel method for the preparation of these unsaturated cyclic hydrocarbon monomers.

Many unsaturated hydrocarbons of different types are known and they find use in many applications, among which is the preparation of polymers for use in the manufacturing of films, fibers, coating compositions, and the like. In many cases thermoplastic polymers soluble in common solvents are preferred; however, in other cases, polymers that are initially soluble and thermoplastic for easy forming into the desired shaped articles, but which can be converted to insoluble crosslinked products after they are shaped, are desired. Recently proposed polymers of this type containing cyclobutene rings which can be readily crosslinked by moderate heating are described in U.S. Patent applications Serial Nos. 528,111, now abandoned, and 528,112, filed August 16, 1955 by J. L. Anderson, and Serial No. 528,820, now U.S. Patent No. 2,842,474, filed August 16, 1955 by B. C. Pratt. Since many of the properties or characteristics of a polymer depend on the particular structure of the monomers from which the polymer is prepared, it is a very desirable goal to develop new cyclobutenes having novel characteristics and which are capable of forming crosslinkable polymers of improved properties.

It is an object of this invention to provide new monomeric and polymeric hydrocarbons. A further object is to provide a new type of unsaturated cyclic hydrocarbons and their polymers. A still further object is to provide a novel class of substituted cyclobutenes which are capable of forming cross-linkable polymers of improved characteristics. Another object is to provide a novel method for the preparation of these substituted cyclobutenes. Other objects will appear hereinafter.

These and other objects of this invention are accomplished by providing substituted cyclobutenes having a methyl group directly attached to the carbon atom in the 1-position of the cyclobutene ring and having the carbon atom in the 3-position of the cyclobutene ring joined by a double bond to an extra-annular, i.e., exocyclic, carbon atom, the remaining free valences of the carbon atoms of said cyclobutene ring and of the said extra-annular carbon being satisfied by hydrogen or by hydrocarbon radicals free from aliphatic unsaturation, at least one of the carbon atoms from the class consisting of the carbon atom in the 4-position of the cyclobutene ring and said extra-annular carbon atom having directly attached thereto two hydrogen atoms.

The substituted cyclobutenes of this invention have the general formula

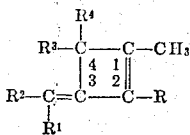

wherein R, $R^1$, $R^2$, $R^3$ and $R^4$ are hydrogen or hydrocarbon radicals free from aliphatic unsaturation, such as alkyl, cycloalkyl or aryl, and at least one of the pairs $R^1$, $R^2$ and $R^3$, $R^4$ are hydrogen. It is preferred that the total number of carbon atoms in the substituted cyclobutenes of this invention be not more than 30. A preferred class of the substituted cyclobutenes of this invention is where the R, $R^1$, $R^2$, $R^3$ and $R^4$ groups are hydrogen or hydrocarbon radicals free from aliphatic unsaturation of not more than 8 carbon atoms and especially alkyl radicals of not more than 8 carbon atoms. A still more preferred class of products of this invention are the 3-alkylidene-1-methyl-1-cyclobutenes in which the alkylidene group contains not over 17 carbon atoms and the free valences of the carbon atoms in the 2- and 4-positions of the cyclobutene ring are attached only to hydrogen.

A preferred class of the substituted cyclobutenes of this invention have the general formula

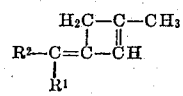

wherein $R^1$ and $R^2$ are hydrogen or hydrocarbon radicals free from aliphatic unsaturation with the sum of carbon atoms in $R^1$ and $R^2$ being not over 16. The most preferred substituted cyclobutenes are the 3-alkylidene-1-methyl-1-cyclobutenes wherein the alkylidene group contains not more than 17 carbon atoms. It is preferred that $R^1$ and $R^2$ be hydrogen or alkyl of not more than 8 carbon atoms.

This invention also includes the polymers of the substituted cyclobutenes herein disclosed including their homopolymers and their copolymers with one or more other polymerizable ethylenically unsaturated monomers. The homopolymers and the copolymers containing at least 1.0% by weight of repeating units derived from the substituted cyclobutenes are capable of being crosslinked to insoluble and infusible polymers on heating to a temperature between 100° and 325° C.

The substituted cyclobutenes of this invention are prepared by pyrolyzing the corresponding substituted 1-cyclobutylmethyltrimethylammonium hydroxides.

A preferred way of carrying out the process of this invention comprises heating an aqueous solution of the substituted 1-cyclobutylmethyltrimethylammonium hydroxide, prepared as described hereinafter, to evaporate the water and then continuing the heating at a temperature of at least 100° C., e.g., at 100°–200° C., and isolating the substituted 1-methyl-1-cyclobutene that forms. Temperatures below 100° C. are operable in the pyrolysis of the quaternary ammonium hydroxide, but they are not preferred since the rate of pyrolysis to the desired substituted 1-methyl-1-cyclobutene is too slow for practical purposes. Temperatures above 200° C. can also be used, but are not necessary to obtain the desired pyrolysis reaction. The pressure at which the pyrolysis is carried out is not critical; atmospheric, subatmospheric, and superatmospheric pressures can all be used. When a relatively volatile 3-alkylidene-1-methylcyclobutene is being prepared, it is very convenient to carry out the pyrolysis at a temperature above the boiling point of the desired 3-alkylidene-1-methylcyclobutene at the pressure at which the pyrolysis is being conducted, so that the product is distilled into a receiver as it is formed. When higher boiling products are being prepared, they can be isolated as the nonvolatile residue remaining in the pyrolysis vessel after the by-products have been removed.

This pyrolysis of the substituted cyclobutylmethyltrimethylammonium hydroxides to the new substituted cyclobutenes of this invention is an unusual reaction involving the rearrangement of a double bond. This is illustrated by the following formulas showing the preparation of 1-methyl-3-methylene-1-cyclobutene by the process described in Example I:

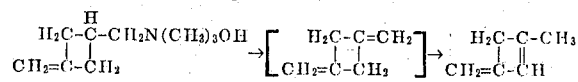

The quaternary ammonium hydroxide starting materials for use in the process of this invention can be prepared as follows. A mixture of an allene of the formula

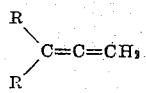

wherein R is hydrogen, alkyl, aryl or cycloalkyl, and a 1-alkenenitrile of the formula RCH=CHCN, where R is hydrogen, alkyl, cycloalkyl or aryl, are heated in the absence of a polymerization initiator to 150° to 250° C. Preferably an excess of the 1-alkenenitrile and a polymerization inhibitor are used and the reaction is carried out at a temperature of 150–200° C. under the autogenous pressure developed in a closed reaction vessel for a period of 4–16 hours. This process is described in greater detail in U.S. patent application Serial No. 532,-376, filed September 2, 1955 by H. N. Cripps, now U.S. Patent 2,914,541. The substituted cyclobutanecarbonitrile, e.g., 3-alkylidenecyclobutanecarbonitrile, obtained by this process is reduced by lithium aluminum hydride in anhydrous ether reaction medium to the corresponding substituted cyclobutylmethylamine, e.g. 3-alkylidene-1-cyclobutylmethylamine. This amine is treated in an aqueous solution of sodium hydroxide with methyl iodide, first at a temperature of 15–25° C. and then at 90° C. in an atmosphere of nitrogen to form the quaternary ammonium iodide. The substituted 1-cyclobutylmethyltrimethylammonium iodide, e.g. 3-alkylidene-1-cyclobutylmethyltrimethylammonium iodide, is converted to the quaternary hydroxide by treatment with an aqueous slurry of silver oxide. After removal of the silver iodide formed as a by-product, the resulting aqueous solution of substituted 1-cyclobutylmethyltrimethylammonium hydroxide, e.g. 3-alkylidene-1-cyclobutylmethyltrimethylammonium hydroxide, can be used directly after removal of the water in the pyrolysis process of this invention.

The polymers of the substituted cyclobutenes of this invention can be prepared by conventional addition polymerization techniques. Thus, the 3-alkylidene-1-methyl-1-cyclobutenes can be polymerized by themselves or with one or more other additional polymerizable ethylenic compounds by bulk, solution, emulsion or bead methods. The polymerization can be initiated by ionic free radical-generating and coordination-type catalysts used in conventional proportions ranging from 0.01 to 10% or more of the weight of the monomers being polymerized.

In preparing copolymers the proportions of the substituted 1-cyclobutene and the other copolymerizable monomers can vary widely, the exact proportions of reactants employed being dependent on the particular monomers being used and the proportion of substituted 1-cyclobutene units desired in the copolymer. When the substituted methylcyclobutene and the comonomer with which it is being polymerized have approximately the same rates of polymerization, the proportions of the comonomers employed are substantially the same as the proportions of the different monomer units desired in the final copolymer. However, when the polymerization rates of the different monomers are substantially different, larger proportions of the slower polymerizing monomer are employed if substantial quantities of that particular monomer unit are desired in the copolymer.

The temperature at which the polymerization of the substituted cyclobutene is carried out can vary widely, depending on the particular initiator being used, and on the particular comonomers being employed if a copolymer is being prepared. Temperatures as low as −80° C. and as high as 150° C. or more can be used. Of course, the reaction conditions selected should be such that appreciable crosslinking of the polymer does not take place during its preparation. This is accomplished in general by carrying out the preparation of the polymers at temperatures below 150° C. since higher temperatures cause more rapid crosslinking.

The following examples illustrate the products and process of this invention in greater detail. In these examples the proportions of ingredients are expressed in parts by weight unless otherwise specified.

EXAMPLE I

An aqueous solution of 3-methylene-1-cyclobutylmethyltrimethylammonium hydroxide, prepared from 401 parts of 3-methylene-1 - cyclobutylmethyltrimethylammonium iodide and silver oxide as described above, is concentrated by distillation at atmospheric pressure. When the pot temperature reaches 125° C., the distillate begins to come over in two phases and these are collected in a cooled receiver. The reaction mixture is stirred and heated until decomposition is complete and no more material distills over. The upper layer of the distillate is separated from the lower aqueous layer and is washed free of trimethylamine with water. The crude washed product is distilled through a 12″ packed fractionating column and there is obtained 88 parts, corresponding to a yield of 75% of the theory, of 1-methyl-3-methylenecyclobutene, boiling at 70–70.5° C. and having a refractive index, $n_D^{25}$, of 1.4598.

*Analysis.*—Calcd. for $C_6H_8$: C, 89.94%; H, 10.06%. Found: C, 89.54%; H, 10.40%.

The proton magnetic resonance spectrum of this material is in accordance with the following structural formula:

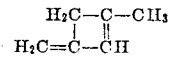

1-methyl-3-methylene-1-cyclobutene

The infrared spectrum of this 1-methyl-3-methylenecyclobutene has the following characteristic absorption bands:

| Liquid, microns | Gas, microns |
|---|---|
| 3.28 | 3.26 |
| 3.45 | 3.43 |
| 6.00 | 3.50 |
| 6.27 | 5.95 |
| 7.30 | 6.25 |
| 11.75 | 11.66 |

The ultraviolet absorption spectrum shows $\lambda_{max}$ 2240, $k=176$.

EXAMPLE II

An aqueous solution of 3-isopropylidene-1-cyclobutyltrimethylammonium hydroxide obtained from 155 parts of 3-isopropylidene-1 - cyclobutylmethyltrimethylammonium iodide and aqueous silver oxide is evaporated to a syrup at 40° C. under reduced pressure (approximately 2.3–100 mm. mercury). This syrup is then heated in an oil bath at a bath temperature of 120–130° C. at a pressure of 1.3 to 2.3 mm. mercury. The volatile materials which are evolved are collected in a receiver cooled in a mixture of acetone and solid carbon dioxide. Heating is continued until no further distillate is obtained. The distillate is then allowed to warm to room temperature and the upper organic layer is separated from the lower aqueous layer. The organic layer is washed with cold water and the crude 1-methyl-3-isopropylidenecyclobutene is distilled. The portion boiling at 129–129.5° C. is washed with 10% aqueous acetic acid, followed by a saturated sodium bicarbonate solution and is then dried over magnesium sulfate. The dried product is redistilled through a 12″ packed fractionating column and there is obtained 14 parts (corresponding to 26% of theory) of 1-methyl-3-isopropylidene-1-cyclobutene boiling at 130–130.5° C. and having a refractive index, $n_D^{25}$, of 1.4742.

*Analysis.*—Calcd. for $C_8H_{12}$: C, 88.81%; H, 11.19%. Found: C, 88.71%; H, 11.19%.

The proton magnetic resonance spectrum obtained on this product is in accordance with the following structural formula:

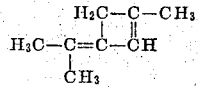

1-methyl-3-isopropylidene-1-cyclobutene

The infrared absorption spectrum exhibits the following characteristic bands: 3.29, 3.38, 3.45, 3.50, 6.25, and 7.30 microns.

EXAMPLE III

An aqueous solution of 2,2-dimethyl-3-methylene-1-cyclobutylmethyltrimethylammonium hydroxide, prepared from 148 parts of 2,2-dimethyl-3-methylene-1-cyclobutylmethyltrimethylammonium iodide and a slurry of silver oxide as described previously, is concentrated by distillation at atmospheric pressure. When the pot temperature reaches 145° C., the distillate begins to distill in two phases. These two phases are collected in a receiver and pyrolysis is continued until the pot temperature reaches 160° C. The upper organic layer of the distillate is separated from the lower aqueous layer and is washed free of trimethylamine with water and is then dried over potassium hydroxide. The crude product is distilled through a 12″ packed column and there is obtained 31 parts, corresponding to a yield of 57% of the theory, of 1,4,4-trimethyl-3-methylene-1-cyclobutene, boiling at 95° C. and having a refractive index, $n_D^{25}$, of 1.4413. This compound has a turpentine-like odor.

*Analysis.*—Calcd. for $C_8H_{12}$: C, 88.81%; H, 11.19%. Found: C, 89.12%; H, 11.29%.

The proton magnetic resonance spectrum obtained on this product is in accordance with the following structural formula:

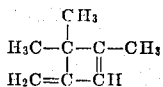

1,4,4-trimethyl-3-methylene-1-cyclobutene

The infrared absorption spectrum of this product exhibits absorption bands as follows: 3.30, 3.41, 5.98, 6.27, 6.96, 7.03, 7.26, 7.37, 7.74, and 11.78 microns.

EXAMPLE IV (A) *Catalyst preparation*

Lithium aluminum tetradecyl is prepared from 70 parts of 1-decene and 3.8 parts of lithium aluminum hydride in 80 parts of decahydronaphthalene by heating at 130° C. for 30 minutes and at 175° C. for 45 minutes. The reaction mixture is made up to a total volume of 500 parts by volume with cyclohexane. Fresh catalyst is prepared immediately before use from 10 parts by volume of the lithium aluminum tetradecyl solution and 1 part by volume of a solution of 0.25 part of freshly distilled titanium tetrachloride in 0.75 part of cyclohexane.

(B) *Polymerization of 1-methyl-3-methylenecyclobutene*

Eleven parts of the above freshly prepared catalyst solution is mixed into 78 parts of cyclohexane and stirred under an atmosphere of nitrogen. A solution of 3.4 parts of 1-methyl-3-methylene-1-cyclobutene in 7.8 parts of cyclohexane is added slowly during a period of about one hour, and the polymerization mixture is heated slowly to a temperature of 50° C. Stirring is continued at 50–55° C. for 16 hours and finally for 2 hours at 70° C. The catalyst is destroyed and the product is isolated by adding an excess of methanol to the reaction mixture. There is obtained about 3.4 parts of a gummy homopolymer of 1-methyl-3-methylene-1-cyclobutene. It is soluble in benzene and has an inherent viscosity of 0.06, measured at 0.1% concentration in tetrahydronaphthalene at 125° C. Infrared analysis of the polymer shows the presence of $C=C$ and $=CH$ groups. When the polymer is heated at 150° C., it loses its tackiness after 2 minutes and becomes a rubbery solid. When heated for 2 minutes at 250° C., the polymer crosslinks rapidly to form a hard solid. The crosslinked materials are insoluble in benzene.

EXAMPLE V

A stainless steel reaction vessel is charged with 8.3 parts of 1,1,4,4-tetrafluoro-1,3-butadiene, 0.1 part of benzoyl peroxide and 1 part of 1-methyl-3-methylene-1-cyclobutene and pressured by water injection to 3000 atmospheres at 100° C. The reactor is agitated for 4 hours while maintaining the pressure at 2800–3000 atmospheres. The product is isolated by releasing the pressure and decanting supernatant liquid from the solid polymer. The yield of polymer obtained is 5 parts. This polymer contains 51.7% fluorine, 44.9% carbon, and 3.0% hydrogen. These analyses indicate that the copolymer contains tetrafluorobutadiene and 1 - methyl - 3 - methylenecyclobutene units in the ratio of about 90:10. Infrared absorption spectrum obtained on the copolymer shows the presence of bands characteristic of polytetrafluorobutadiene at 3.2 (H in $F_2C=CH$), 3.35 (sat'd. CH), 5.7 ($CH=CF_2$, double bond), 5.90 (for internal $C=C$) microns, and additional bands at 3.4 and 6.1 microns characteristic of the cyclobutene ring.

EXAMPLE VI

The process of Example V is duplicated except that 8.9 parts of 1,1,4,4-tetrafluoro-1,3-butadiene and 2 parts of 1-methyl-3-methylene - 1-cyclobutene are employed. The product obtained amounts to 3 parts of a very viscous oil that can be crosslinked at 180° C. in 5 minutes to form a tough, hard solid. The infrared absorption is characteristic of polytetrafluorobutadiene and cyclobutene rings. The polymer contains 53.1% carbon, 4.8% hydrogen, and 35.2% fluorine which indicates a ratio of tetrafluorobutadiene to 1-methyl - 3 - methylenecyclobutene of about 60:40.

EXAMPLE VII

The procedure of Example V is duplicated with the exceptions that 10.3 parts of 1,1,4,4-tetrafluoro-1,3-butadiene and 0.1 part of 1-methyl-3-methylene-1-cyclobutene are employed, and the polymerization is carried out for 16 hours. There is obtained 9.8 parts of a tough, flexible solid copolymer of 1,1,4,4-tetrafluoro-1,3-butadiene and 1-methyl-3-methylene-1-cyclobutene. This polymer can be molded into a film at 230° C. Molded film that has been heated for 5 minutes at 230° C. cannot be remolded, and this indicates that the polymer is crosslinked. The polymer contains 38.8% carbon, 2.1% hydrogen, and 59.0% fluorine. These results indicate that the copolymer contains tetrafluorobutadiene and 1-methyl-3-methylenecyclobutene in the ratio of about 99:1.

EXAMPLE VIII

A mixture of 121 parts of methyl ethyl ketone, 7.35 parts of maleic anhydride, 6.00 parts of 1 - methyl-3-methylene-1-cyclobutene and 0.134 part of alpha,alpha'-azodiisobutyronitrile is stirred under a nitrogen atmosphere and heated at approximately 76° C. for 3 hours. The viscous solution obtained is cooled and is then slowly poured into approximately 565 parts of diethyl ether with stirring to precipitate the copolymer. The fibrous white copolymer is washed twice with ether (approximately 142 parts) and the polymer is dried at 50° C. under reduced pressure (about 200 mm. mercury) for one hour. The dry polymer, amounting to 11.2 parts, is formed in 83.9% conversion. The polymer softens at 110–115° C. and is soluble in methyl ethyl ketone, acetophenone, acetone, dimethylformamide, and dilute aqueous ammonium hydroxide. A 10% solution of the polymer in methyl ethyl ketone forms a clear film when poured on a glass plate and the solvent allowed to evaporate at room temperature. The copolymer has a neutral equivalent of 90.4. The calculated neutral equivalent for a copolymer having alternating 1-methyl-3-methylenecyclobutene and maleic anhydride units is 89.0. The infrared absorption spectrum of the copolymer shows the following absorption bands: CH= (unsaturated CH) at 3.25 microns, CH (saturated CH) at 3.40 microns, acid anhydride at 5.35 and 5.60 microns, and C=C at 6.1 microns. The infrared spectrum shows no absorption band characteristic of the terminal methylene, $CH_2=$, group.

EXAMPLE IX

A solution of 5 parts of 1-methyl-3-methylene-1-cyclobutene in 30 parts of carbon disulfide is cooled to 10° C. To this solution is added about 0.2 part of anhydrous stannic chloride, whereupon the solution warms rapidly from the exothermic polymerization. The solution is cooled externally to maintain a solution temperature of 20–30° C. When the exothermic reaction subsides after about 15 minutes, the solution is allowed to stand at room temperature, 25° C., for one hour. To the reaction mixture is added 5 parts of water and 4 parts of ethanol, and the carbon bisulfide is removed by evaporation under reduced pressure. The residue is washed three times with methanol and is then dissolved in warm benzene. The polymer is precipitated from the benzene solution by adding methanol. The mixture is cooled to 10° C. and the supernatant liquid decanted. The residue is washed once with methanol and is then dissolved in xylene. The methanol in the solution is distilled off under reduced pressure, leaving a xylene solution of the 1-methyl-3-methylene-1-cyclobutene homopolymer. This solution contains 32.1% polymer solids and has a viscosity of 0.06 poise at 25° C.

Ten parts of this solution, to which has been added 0.0025 part of cobalt naphthenate as a drier, is flowed onto a glass plate and the solvent is allowed to evaporate. In 1 to 3 hours at room temperature surface curing of the film occurs and after three days a tack-free film of good hardness and toughness is obtained. Films prepared from xylene solutions containing cobalt naphthenate drier cure rapidly, 10–60 minutes, when baked at temperatures of 100°–150° C. and form hard tack-free coatings which are insoluble in hydrocarbon solvents.

EXAMPLE X

To a solution of 200 parts of ethyl chloride cooled to −60° C. by means of an acetone/solid carbon dioxide mixture, is added 0.01 part of boron trifluoride followed by the portionwise addition of a cold (−80° C.) solution of 52 parts of isobutylene and 6.6 parts of 1-methyl-3-methylene-1-cyclobutene. After stirring for 10 minutes an additional 0.01 part of boron trifluoride is passed over the solution held at −60° to −80° C. Similar additions of boron trifluoride are made at ten-minute intervals until a total of about 0.06 part of boron trifluoride has been added and a slight excess of boron trifluoride vapor persists above the reaction solution. After stirring for an additional 45 minutes, 20 parts of methanol is added to precipitate the polymer. The liquid is decanted from the precipitated polymer and the polymer is dissolved in 88 parts of benzene. Residual ethyl chloride is removed from the solution by warming to 60° C. The residual solution amounts to 266 parts and it contains 20.5% polymer solids, corresponding to a yield of 54.5 parts of copolymer of isobutylene and 1-methyl-3-methylene-1-cyclobutene. The infrared absorption spectrum obtained on this copolymer indicates that the copolymer contains the cyclobutene ring structure. Certain portions of the spectrum compare closely with the spectrum of the 1-methyl-3-methylenecyclobutene homopolymer of Example IX.

EXAMPLE XI

A copolymer of ethylene and 1-methyl-3-methylene-1-cyclobutene is prepared in the presence of a lithium aluminum tetradecyl-titanium tetrachloride coordination catalyst system which has been prepared in cyclohexane solvent. In carrying out the polymerization, the catalyst components are combined by the dropwise addition, with vigorous stirring in a nitrogen atmosphere, of 10 parts by volume of 1 N titanium tetrachloride solution to a mixture of 50 parts by volume of a 0.2 N lithium aluminum tetradecyl solution and 350 parts by volume of cyclohexane. Ethylene is passed into the resulting black suspension at the rate of 12.9 parts/hour. After a temperature rise of 2° C. is observed (five minutes), a solution of 4.03 parts of 1-methyl-3-methylene-1-cyclobutene in 20 parts of cyclohexane is added dropwise over a period of 15 minutes. The ethylene addition is continued for 1.67 hours (total polymerization time of two hours), and at the end of this time the catalyst is destroyed by the addition of 16 parts of methanol. The polymer solution is poured into excess methanol to precipitate the polymer which is then filtered out and washed four times with methanol. After drying at 50° C. under vacuum, there is obtained 24.1 parts of a white fluffy solid which softens at 120–125° C. This copolymer is ethylene and 1-methyl-3-methylenecyclobutene has an inherent viscosity of 6.43 measured as a 0.1% solution in tetrahydronaphthalene at 125° C. The polymer contains 85.74% carbon and 13.74% hydrogen. These analytical results show that the polymer contains approximately 13% of the cyclobutene monomer. The infrared absorption spectrum of the polymer has a band at 12.5 microns and shows increased methyl absorption at 7.3 microns as compared with a polyethylene control.

The copolymer of Example XI does not dissolve completely in alpha-chloronaphthalene at 140° C. after being heated at 190° C. for 30 minutes. A control sample of polyethylene remains soluble in alpha-chloronaphthalene after a similar heat treatment at 190° C.

Copolymers of ethylene and 1-methyl-3-methylenecyclobutene containing different ratios of the two components can be prepared by the procedure of Example XI by changing the initial ratios of the two monomers.

In addition to the specific substituted 1-cyclobutenes mentioned in the examples, the monomeric products of this invention include others coming within the following general formula:

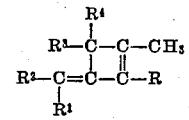

wherein R, $R^1$, $R^2$, $R^3$ and $R^4$ are hydrogen, alkyl, cycloalkyl or aryl, preferably of not more than 8 carbon atoms each and in which the total number of carbon atoms in the cyclobutene compound is not over 30 carbon atoms, with at least one of the pairs $R^1$, $R^2$ and $R^3$, $R^4$ being hydrogen. Among the other specific compounds that are included are the following:

1-methyl-3-methylene-4-phenyl-1-cyclobutene,
4,4-diethyl-1-methyl-3-methylene-1-cyclobutene,
1,2-dimethyl-3-methylene-1-cyclobutene,
1-methyl-3-benzhydrylidene-1-cyclobutene,
1-methyl-2-ethyl-3-methylene-1-cyclobutene,
1-methyl-3-(9'-heptadecylidene)-1-cyclobutene,
1-methyl-3-cyclohexylidene-1-cyclobutene,
1-methyl-2-phenyl-3-methylene-1-cyclobutene,
1-methyl-2-isopropyl-3-methylene-1-cyclobutene,
1-methyl-4,4-dioctyl-3-methylene-1-cyclobutene, and
1-methyl-3-methylenespiro[3,5]non-1-ene.

These specific 3-alkylidene-1-methyl-1-cyclobutenes are made following the procedure set forth in Examples I to III from the following quaternary ammonium hydroxides:

3-methylene-4-phenyl - 1 - cyclobutylmethyltrimethylammonium hydroxide,
2,2-diethyl - 3 - methylene - 1 - cyclobutylmethyltrimethylammonium hydroxide,
2-methyl-3-methylene - 1 - cyclobutylmethyltrimethylammonium hydroxide,
3 - benzhydrylidenecyclobutylmethyltrimethylammonium hydroxide,
2-ethyl - 3 - methylenecyclobutylmethyltrimethylammonium hydroxide,
3 - (9'-heptadecylidene)cyclobutylmethyltrimethylammonium hydroxide,
3 - cyclohexylidenecyclobutylmethyltrimethylammonium hydroxide,
2-phenyl - 3 - methylenecyclobutylmethyltrimethylammonium hydroxide,
2-isopropyl - 3 - methylenecyclobutylmethyltrimethylammonium hydroxide,
2,2-dioctyl - 3 - methylenecyclobutylmethyltrimethylammonium hydroxide, and
3-methylenespiro[3,5]nonyl - 1 - methyltrimethylammonium hydroxide.

In addtion to the specific copolymers illustrated in the examples, the polymers of this invention include copolymers of the substituted cyclobutenes with any ethylenically unsaturated compound capable of undergoing addition polymerization. Ethylenically unsaturated polymerizable monomers which are operable in the present invention include olefins, both aliphatic mono- and diolefins, e.g., ethylene, propylene, butadiene, and isoprene; vinyl and vinylidene halides, e.g., vinyl fluoride and vinylidene chloride; vinyl esters, e.g., vinyl benzoate, vinyl acetate, vinyl laurate; vinyl ketones, e.g., ethyl vinyl ketone and methyl isopropenyl ketone; acrylic and methacrylic acids and their derivatives, such as esters, nitriles, and anhydrides, e.g., ethyl acrylate, methyl methacrylate, methacrylonitrile, and methacrylic acid; butenedioic acids and their derivatives, e.g., fumaric and maleic acids and their esters, nitriles, and anhydrides; and substituted ethylenes, e.g., trifluoroethylene, tetrafluoroethylene, chlorotrifluoroethylene, styrene, and alpha-methylstyrene. Combinations of two or more of these unsaturated compounds are useful for copolymerization with the 3-alkylidene-1-methyl-1-cyclobutenes. Ethylenically unsaturated monomers containing at least one terminal methylene group are preferred for copolymerization with the 3-alkylidene-1-methyl-1-cyclobutenes.

The monomeric substituted cyclobutenes of this invention are useful in a variety of applications. They are particularly useful for polymerization to polymers that contain the cyclobutene ring. The presence of the cyclobutene ring in the polymer makes the polymer of great value in certain applications because of the susceptibility of the cyclobutene to opening at moderately elevated temperatures to produce crosslinking of the polymer chain. The presence of the cyclobutene ring in the polymer enables the use of relatively low molecular weight polymers in forming objects of the desired shape and then by simple heat treatment changing the shaped polymer to an insoluble solid polymer.

The monomers of this invention are also useful as perfume ingredients or odorants because of unusual odors they possess.

The polymers of this invention are particularly useful for the preparation of films, fibers, coating compositions, and the like. The polymers can be dissolved in common solvents, e.g., benzene, methyl ethyl ketone, dimethylformamide, and the resulting solutions used to form films, fibers, and coating compositions. Air-drying compositions can be prepared by incorporating metallic driers, e.g., cobalt naphthenate, in the polymer solutions. The films, fibers, and coatings prepared from these polymers can be crosslinked by heating to moderate temperatures, e.g., 100° to 250° C., to make them dimensionally stable and to make them solvent-resistant. The polymers can also be used to prepare laminates which can be rapidly set by heat alone after being formed into the desired shape. The polymers of the substituted cyclobutenes of this invention are also particularly useful when incorporated in printing inks since inks containing such polymers can be set very rapidly by heat treatment.

The substituted cyclobutenes of this invention have an unexpected stability to heat in comparison with the known methylenecyclobutenes having no substituents on the unsaturated annular carbons. For example, 3-methylene-1-cyclobutene and 4,4-dimethyl-1-methylene-2-cyclobutene polymerize readily and spontaneously at room temperature, and the 3-methylene-1-cyclobutene cannot be distilled without considerable formation of polymer in the distilling column. The presence of a phenyl group on one of the unsaturated annular carbons of the methylenecyclobutene likewise does not prevent polymerization of the monomer. For example, 3-methylene-1-phenyl-1-cyclobutene polymerizes readily and spontaneously at room temperature.

In contrast to this behavior of these known methylenecyclobutenes, the substituted cyclobutenes of this invention are remarkedly stable. For example, 1-methyl-3-methylene-1-cyclobutene containing a trace of hydroquinone can be heated in a sealed glass tube in the presence of a small amount of air at a temperature up to 200° C. for one-half hour with no visible change. The stability of this monomer at 200° C. is proved by the finding that its spectra after heating is the same as the spectra of the pure compound. The methylenecyclobutenes of this invention having a methyl group on one of the unsaturated annular carbons have a different order of reactivity because of this particular structure. 1-methyl - 3 - methylene-1-cyclobutene polymerizes more readily with coordination catalysts to form homopolymers than does 3-methylene-1-cyclobutene. On the other hand, it does not copolymerize with acrylates in free radical systems as readily as does 3-methylene-1-cyclobutene.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows.

I claim:

1. A substituted cyclobutene-1 having a methyl group directly attached to the carbon atom in the 1-position of the cyclobutene ring and having the carbon atom in the 3-position of the cyclobutene ring joined by a double bond to an extra-annular carbon atom, the remaining free valences of the carbon atoms of said cyclobutene ring and of said extra-annular carbon atom being satisfied by members selected from the class consisting of hydrogen and hydrocarbon radicals free from aliphatic unsaturation and of not more than 8 carbon atoms, at least one of the carbon atoms from the class consisting of said extra-annular carbon atom and the carbon atom in the 4-position of the cyclobutene ring having directly attached thereto two hydrogen atoms.

2. A homopolymer of a substituted cyclobutene as set forth in claim 1.

3. A homopolymer of a substituted cyclobutene as set forth in claim 1 with another polymerizable ethylenically unsaturated monomer.

4. A film of a soluble homopolymer of a substituted cyclobutene as set forth in claim 1.

5. A film of a soluble copolymer of a substituted cyclobutene as set forth in claim 1 with another polymerizable ethylenically unsaturated monomer.

6. A polymer selected from the class consisting of homopolymers of a substituted cyclobutene and copolymers of a substituted cyclobutene with another polymerizable ethylenically unsaturated monomer, wherein said substituted cyclobutene is defined as in claim 1.

7. A homopolymer of 1-methyl-3-methylene-1-cyclobutene.

8. A copolymer of 1-methyl-3-methylene-1-cyclobutene with another polymerizable ethylenically unsaturated monomer.

9. A film of an insoluble, cross-linked homopolymer of a substituted cyclobutene, wherein said substituted cyclobutene is defined as in claim 1.

10. A film of an insoluble, cross-linked copolymer of a substituted cyclobutene, wherein said substituted cyclobutene is defined as in claim 1, with another polymerizable ethylenically unsaturated monomer.

11. A substituted cyclobutene having the formula

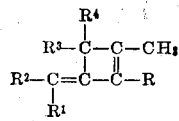

wherein R, $R^1$, $R^2$, $R^3$, and $R^4$ are members of the class consisting of hydrogen and alkyl radicals of not more than 8 carbon atoms, and both Rs of at least one of the pairs $R^1$, $R^2$ and $R^3$, $R^4$ are hydrogen.

12. A homopolymer of a substituted cyclobutene as set forth in claim 11.

13. A copolymer of a substituted cyclobutene as set forth in claim 11 with another polymerizable ethylenically unsaturated monomer.

14. A 3-alkylidene-1-methyl-1-cyclobutene wherein the alkylidene group contains not more than 17 carbon atoms.

15. 1-Methyl-3-methylene-1-cyclobutene.

16. 1-Methyl-3-isopropylidene-1-cyclobutene.

17. 1,4,4-Trimethyl-3-methylene-1-cyclobutene.

18. Process for preparing a substituted cyclobutene which comprises pyrolyzing at a temperature of at least 100° C. a substituted cyclobutylmethyltrimethylammonium hydroxide having the formula

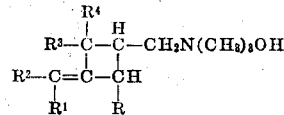

wherein R, $R^1$, $R^2$, $R^3$, and $R^4$ are selected from the class consisting of hydrogen and hydrocarbon radicals free from aliphatic unsaturation and of not more than 8 carbon atoms, at least one of the pairs $R^1$, $R^2$ and $R^3$, $R^4$ being hydrogen, and separating as the resulting product a substituted cyclobutene having the formula

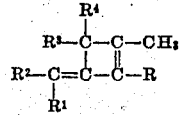

wherein R, $R^1$, $R^2$, $R^3$, and $R^4$ are defined as aforesaid.

19. Process for preparing a 3-alkylidene-1-methyl-1-cyclobutene which comprises heating at a temperature of up to 200° C. a 3-alkylidene-1-cyclobutylmethyltrimethylammonium hydroxide wherein the alkylidene group contains not more than 17 carbon atoms, and separating as the resulting product a 3-alkylidene-1-methyl-1-cyclobutene wherein the alkylidene group contains not more than 17 carbon atoms.

20. Process for preparing 1-methyl-3-methylene-1-cyclobutene which comprises heating at a temperature of up to 200° C. 3-methylene-1-cyclobutylmethyltrimethylammonium hydroxide, and separating as the resulting product 1-methyl-3-methylene-1-cyclobutene.

21. Process for preparing 1-methyl-3-isopropylidene-1-cyclobutene which comprises heating at a temperature of up to 200° C. 3-isopropylidene-1-cyclobutylmethyltrimethylammonium hydroxide, and separating as the resulting product 1-methyl-3-isopropylidene-1-cyclobutene.

22. Process for preparing 1,4,4-trimethyl-3-methylene-1-cyclobutene which comprises heating at a temperature of up to 200° C. 2,2-dimethyl-3-methylene-1-cyclobutylmethyltrimethylammonium hydroxide, and separating as the resulting product 1,4,4-trimethyl-3-methylene-1-cyclobutene.

References Cited in the file of this patent

UNITED STATES PATENTS 2,842,474     Pratt                 July 8, 1958

OTHER REFERENCES

Buchman: "Abstracts of Papers—126th Meeting, Amer. Chem. Soc.," September 1954, pp. 9–10, No. 14.

Howten et al.: J. Am. Chem. Soc., vol. 78 (1956), page 4011.

Applequist et al.: J. Am. Chem. Soc., vol. 78 (1956), pp. 4012–4022.

UNITED STATES PATENT OFFICE
CERTIFICATION OF CORRECTION

Patent No. 2,995,543                                           August 8, 1961

John K. Williams

It is hereby certified that error appears in the above numbered patent requiring correction and that the said Letters Patent should read as corrected below.

Column 8, line 25, for "is" read -- of --; column 10, line 68, for "homopolymer" read -- copolymer --.

Signed and sealed this 10th day of April 1962.

(SEAL)
Attest:

ERNEST W. SWIDER                                      DAVID L. LADD
Attesting Officer                                         Commissioner of Patents